(12) United States Patent
Zhou (10) Patent No.: US 7,733,672 B2
(45) Date of Patent: Jun. 8, 2010

(54) PROGRAMMABLE CONDUCTION MODE CONTROL FOR SWITCHING CIRCUITS

(75) Inventor: Xigen Zhou, San Jose, CA (US)

(73) Assignee: Linear Technology Corporation, Milipitas, CA (US)

( * ) Notice: Subject to any disclaimer, the term of this patent is extended or adjusted under 35 U.S.C. 154(b) by 332 days.

(21) Appl. No.: 11/605,297

(22) Filed: Nov. 29, 2006

(65) Prior Publication Data

US 2008/0122420 A1 May 29, 2008

(51) Int. Cl.
*H02M 3/335* (2006.01)
(52) U.S. Cl. .................. 363/21.09; 363/97; 323/285
(58) Field of Classification Search ............. 363/16–20, 363/21.12–21.18, 97; 307/80–81
See application file for complete search history.

(56) References Cited

U.S. PATENT DOCUMENTS 6,728,117 B2 * 4/2004 Schemmann et al. ..... 363/21.12
7,045,992 B1 * 5/2006 Silva et al. .................. 323/222
7,132,765 B2 * 11/2006 Premont et al. ............... 307/81
7,288,924 B2 * 10/2007 Trandafir et al. ............ 323/283

\* cited by examiner

*Primary Examiner*—Rajnikant B Patel
(74) *Attorney, Agent, or Firm*—McDermott Will & Emery LLP (57) ABSTRACT

A control system that controls a switching circuit having a switching element and an inductive element coupled to an output of the switching element. The control system includes a switching control circuit that controls the switching element to operate the switching circuit in a first conduction mode of operation, such as a boundary conduction mode (BCM), in which current in the inductive element is maintained at a non-zero level during a first time period within each switching cycle. A conduction mode control circuit is configured for switching the switching circuit into a second conduction mode of operation, such as a discontinuous conduction mode (DCM), in which current in the inductive element is maintained at a non-zero level during a second time period within each switching cycle. The first time period differs from the second time period.

36 Claims, 5 Drawing Sheets

PROGRAMMABLE CONDUCTION MODE CONTROL FOR SWITCHING CIRCUITS

TECHNICAL FIELD

The subject matter of this disclosure relates to power supply circuits, and more particularly to circuitry and methodology for controlling conduction mode in a switching circuit, such as a regulator.

BACKGROUND

Switching regulators usually operate in either a continuous conduction mode (CCM) for higher power applications, or in a discontinuous conduction mode (DCM) for lower power applications. For example, when a switching regulator operates in CCM, current in its inductive element is always above zero, whereas in a DCM switching regulator, current in the inductive element falls to zero during a time period within each switching cycle.

To take full advantage of energy transfer efficiency, most flyback switching regulators operate in DCM where an inherent diode reverse recovery problem is absent and switches operate at zero current turn-on. Due to reduced device stresses, a DCM switching regulator is able to operate at a higher frequency, which results in a smaller transformer size and higher power density. However, DCM operation is associated with high resistive loss and high ripple voltage. To minimize these disadvantages while maintaining advantages of DCM operation, a switching regulator may be controlled to operate at the boundary between CCM and DCM, i.e. in a boundary conduction mode (BCM).

The efficiency of a BCM regulator is higher than that of a DCM regulator. However, the difference in efficiency between these modes becomes much smaller at high line voltage conditions. In addition, BCM operation has some disadvantages. A BCM controller adjusts switching frequency according to load and line conditions. Load step change and line voltage variation affect the switching frequency directly. The resulting variable switching frequency may shift the noise spectrum out of an acceptable range of electromagnetic interference (EMI) and cause uncertainty for EMI filtering.

Variable switching frequency also affects output voltage ripple. When the switching frequency is high, output voltage ripple is low. Conversely, when switching frequency is low, output voltage ripple is high.

Another disadvantage is "jittering" at light load conditions, when the switching frequency can reach a very high level.

DCM operation enables a switching regulator to alleviate the EMI and "jittering" problems and conveniently provide ripple filtering. Therefore, it would be desirable to provide a conduction mode control system that will allow a switching regulator to combine benefits of BCM and DCM by having a capability to operate in either mode, selectively. Also, it would be desirable to control a switching converter so as to support its operation in a hybrid DCM/BCM mode, in which the converter is able to switch between BCM and DCM, depending on specific conditions.

SUMMARY OF THE DISCLOSURE

In accordance with one aspect of the disclosure, a control system that controls a switching circuit having a switching element and an inductive element coupled to an output of the switching element, includes a switching control circuit that controls the switching element to operate the switching circuit in a first conduction mode of operation, such as a boundary conduction mode (BCM), in which current in the inductive element is maintained at a non-zero level during a first time period within each switching cycle. A conduction mode control circuit is configured for switching the switching circuit into a second conduction mode of operation, such as a discontinuous conduction mode (DCM), in which current in the inductive element is maintained at a non-zero level during a second time period within each switching cycle. The first time period differs from the second time period.

Further, the mode control circuit may set the switching circuit into a third conduction mode, in which the switching circuit may operate in the first conduction mode at a first predetermined condition and to operate in the second conduction mode at a second predetermined condition. For example, in the third conduction mode, the switching circuit may be controlled to operate in BCM at a heavy load condition and to operate in DCM at a light load condition.

The switching circuit may include a switching regulator, such as a flyback switching regulator. In the first and second conduction modes, the flyback switching regulator may be controlled to have current in its transformer at a non-zero level during first and second time periods, respectively, in each switching cycle. The first time period may differ from the second time period.

In accordance with an embodiment of the disclosure, the mode control circuit is responsive to a mode control signal having a parameter, such as frequency, programmable to select between the first conduction mode and the second conduction mode. Also, the parameter of the mode control signal may be programmable to enable the switching circuit to operate in the third conduction mode combining the first conduction mode and the second conduction mode.

The mode control circuit may include a signal selector for selecting between the mode control signal and a conduction mode support signal produced. The switching circuit may be controlled to operate in the first conduction mode when the frequency of the mode control signal is set to a value exceeding an expected maximum frequency of the conduction mode support signal. The second conduction mode may be set when the frequency of the mode control signal is less than an expected minimum frequency of the conduction mode support signal. The third conduction mode may be established when the frequency of the mode control signal is in a range between the expected minimum frequency and the expected maximum frequency of the conduction mode support signal.

In accordance with another aspect of the disclosure, a power supply system may comprise a switching circuit, and a mode control circuit for controlling a conduction mode of the switching circuit. The control circuit may be responsive to a mode control signal having a parameter, such as frequency, programmable to enable the switching circuit to switch between the first conduction mode and the second conduction mode.

In accordance with an embodiment of the disclosure, the mode control circuit may include a signal selector for selecting between the mode control signal and a conduction mode support signal supplied to the mode control circuit to operate the switching circuit in the first conduction mode.

The mode control circuit may further include an output circuit responsive to the signal selector for providing a switch control signal for controlling the switching element.

The signal selector may be configured for passing to the output circuit a selected one of the mode control signal and the conduction mode support signal, and preventing from passing to the output circuit a non-selected one of the mode control signal and the conduction mode support signal.

In particular, the signal selector may be configured to pass the conduction mode support signal to the output circuit to operate the switching circuit in the first conduction mode if the signal selector receives the conduction mode support signal after receiving the mode control signal. The mode control signal may be passed to the output circuit to operate the switching circuit in the second conduction mode if the signal selector receives the mode control signal after receiving the conduction mode support signal.

The signal selector may include first and second flip-flop circuits having respective set inputs supplied by the conduction mode support signal and the mode control signal, respectively.

The signal selector may further include an output gate circuit responsive to respective outputs of the first and second flip-flop circuits and having an output connected to respective reset inputs of the first and second flip-flop circuits.

In accordance with a method of the present invention, the following steps are carried out to control a switching circuit:
supporting operation of the switching circuit in the first conduction mode, such as BCM, and
providing a mode control signal having a parameter programmable to enable operation of the switching circuit in the second conduction mode, such as DCM.

Also, the parameter of the mode control signal may be programmable to enable operation of the switching circuit in a third conduction mode combining the first conduction mode and the second conduction mode.

For example, frequency of the mode control signal may be programmable to set a conduction mode of the switching circuit.

The control method of the present disclosure may further comprise the step of selecting between the mode control signal and an additional control signal to provide control of the switching element.

In particular, the switching circuit may be controlled to operate in the first conduction mode if the additional control signal is supplied after the mode control signal. The second conduction mode may be set if the additional control signal is supplied before the mode control signal.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a system for controlling a flyback switching regulator. It will become apparent, however, that the concept of the disclosure is applicable to setting a conduction mode of any switching circuit.

Figure 1:
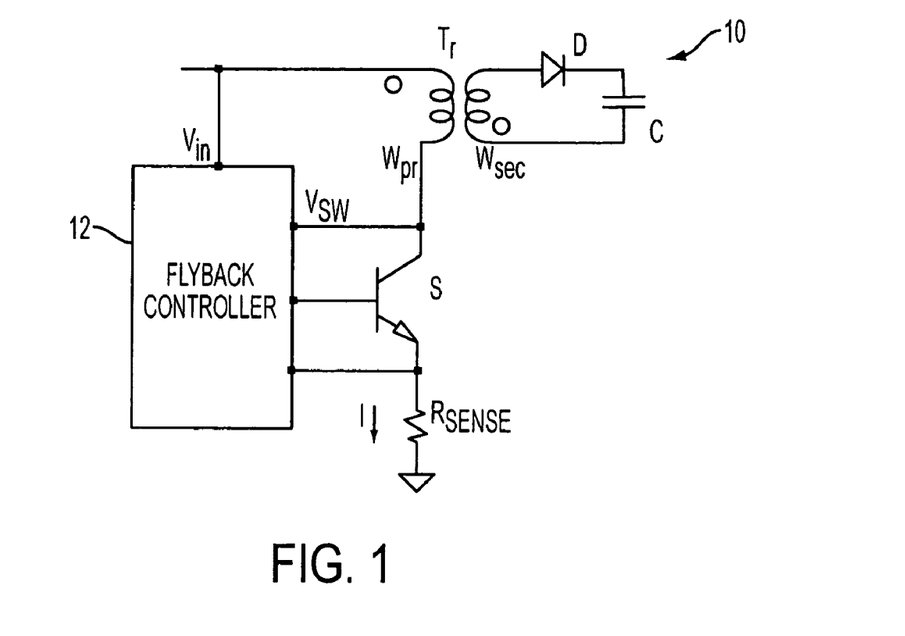
FIG. 1 shows an embodiment of a flyback switching regulator used conventionally in DCM operation.

FIG. 1 shows an exemplary No-Opto flyback switching regulator 10 having a switch S, a transformer Tr with primary and secondary windings $w_{pr}$ and $w_{sec}$, and controller 12 that controls switching of the switch S in BCM operation. A sense resistor Rsense is coupled to the switch S to monitor current I at the output of the switch S. A capacitor C and a diode D are coupled to the secondary winding $w_{sec}$. The flyback switching regular 10 may convert an input DC voltage Vin into one or more output DC voltages with very high power conversion efficiency.

Figure 2:
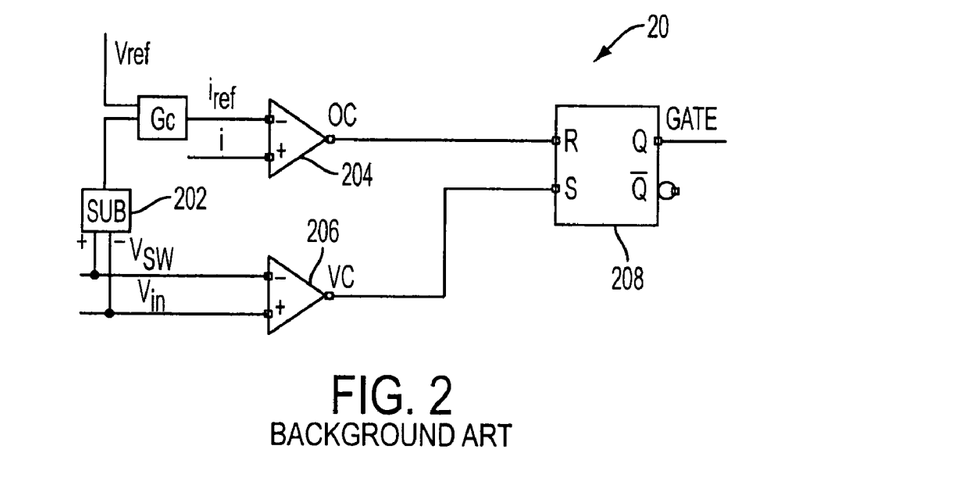
FIG. 2 illustrates an exemplary embodiment of a BCM control block used for controlling a flyback switching regulator.

Referring to FIG. 2, the controller 12 may include a BCM control block 20 for controlling BCM operation of the flyback switching regulator 10. For example, the BCM control block may include a subtraction circuit 202 that determines a difference between the input voltage Vin supplied to the switching regulator 10 and a switching voltage Vsw produced at the output of the switch S. The output signal of the subtraction circuit 202, which reflects the output voltage, is supplied to a compensator Gc that produces a reference current value Iref to regulate the output voltage to Vref. For example, the compensator Gc may be an error amplifier that produces an output current Iref in order to keep the output voltage regulated.

Further, the BCM control block 20 may include an over-current (OC) comparator 204, a voltage collapse (VC) comparator 206, and an RS flip-flop circuit 208 coupled to outputs of the comparators 204 and 206. The OC comparator 204 compares a sensed current I with the reference current value Iref to produce an overcurrent signal OC when the sensed current I reaches the reference current value Iref. For example, the sensed current I may be determined by monitoring a voltage across the sense resistor Rsense.

The VC comparator 206 compares the input voltage Vin with the switch voltage Vsw to produce a voltage collapse signal VC when the switch voltage Vsw falls below the input voltage Vin. The VC signal is supplied to the S-input of the RS flip-flop circuit 208 to set a gate control signal at the Q-output of the RS flip-flop circuit 208. The OC signal is applied as a gate reset signal to the R-input of the RS flip-flop circuit 208 to reset the gate control signal at the Q-output. When the gate control signal is set, it turns on the switch S. When the gate control signal is reset, it turns off the switch S.

Figure 3:
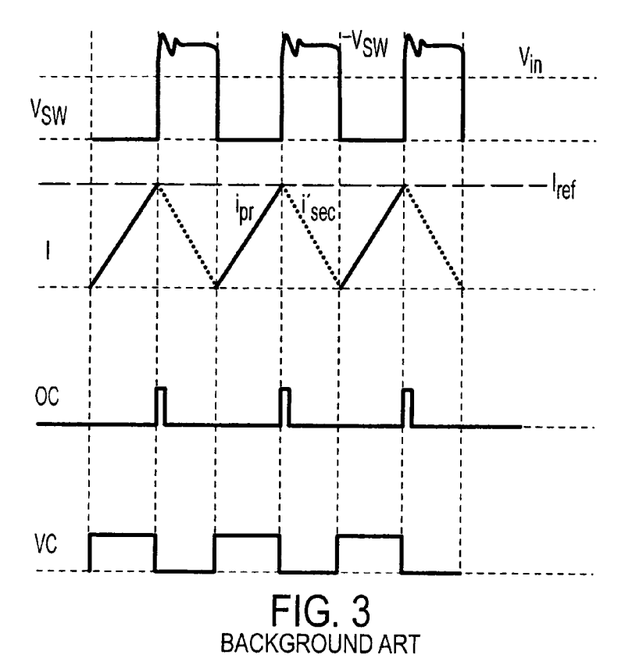
FIG. 3 shows a timing diagram illustrating BCM operation of the flyback switching regulator of FIG. 1.

As illustrated in the timing diagram of FIG. 3, the BCM control block 20 detects collapse of the switch voltage Vsw, which indicates that the current $i'_{sec}$ flowing through the diode D in the secondary winding of the transformer Tr crosses a zero level. Immediately after detecting the switch voltage collapse, the VC signal is produced to turn on the switch S. When the sensed current I represented on the diagram by the current in the primary winding $i_{pr}$ reaches the Iref level, the OC signal (gate reset signal) is produced to turn off the switch S.

Figure 4:
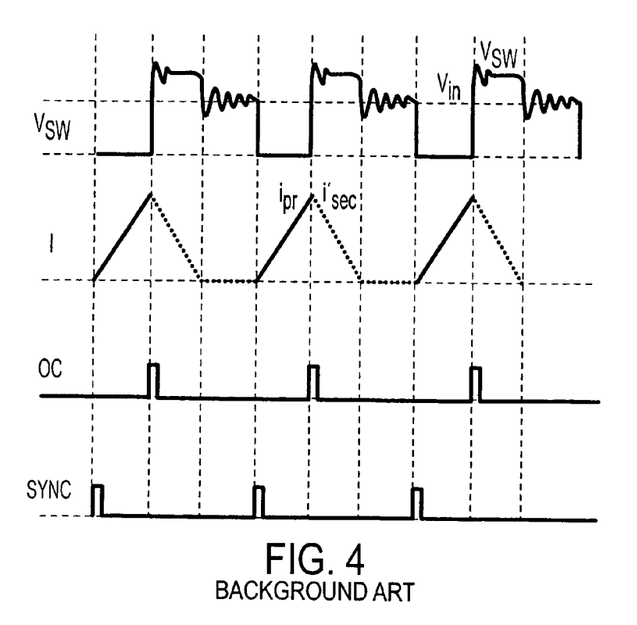
FIG. 4 shows a timing diagram illustrating DCM operation of the flyback switching regulator.

For comparison, FIG. 4 shows a timing diagram illustrating a conventional flyback switching regulator operating in DCM. A fixed frequency synchronization signal SYNC is supplied to turn on the switch of the DCM switching regulator, whereas the OC signal is used to turn off the switch. In the DCM switching regulator, the secondary current i'sec is at a zero level much longer than in the BCM switching regulator described previously. Therefore, the BCM operation substantially reduces the ripple voltage at the output of the switch, and substantially reduces the resistive loss.

Figure 5:
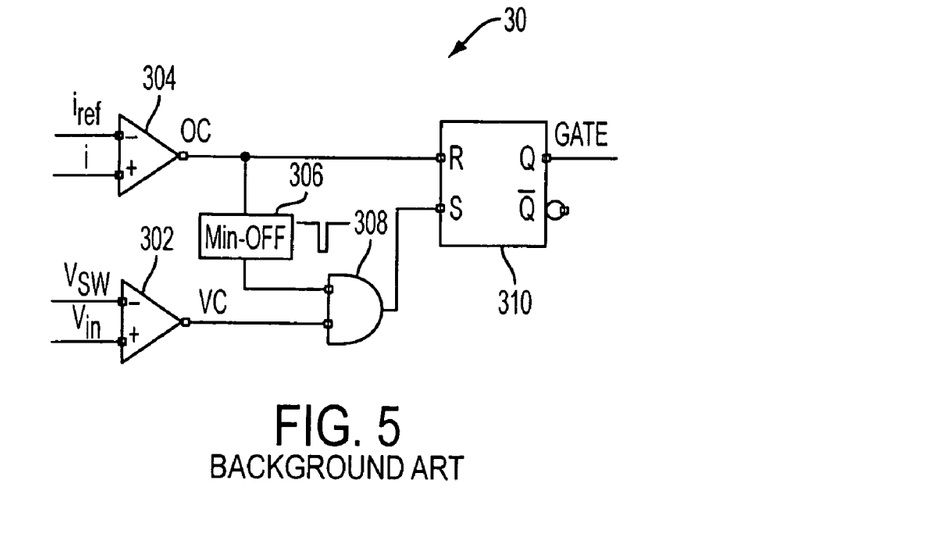
FIG. 5 illustrates minimum off-time control of the flyback switching regulator.

However, BCM operation may result in "jittering" at light load conditions, when the switching frequency can reach a very high level. FIG. 5 illustrates a known BCM control block 30 that provides minimum off-time control to reduce the "jittering" problem. The BCM control block 30 comprises a VC comparator 302 and an OC comparator 304 that generate the VC and OC signals in a manner similar to producing these signals in the BCM arrangement in FIG. 2. Further, the BCM control block 30 includes a fixed time delay circuit Min-OFF 306 that delays the OC signal and supplies the delayed signal to a first input of an AND gate circuit 308. A second input of the AND gate circuit 308 is fed with the VC signal. The output of the AND gate circuit 308 is supplied to the S-input of an RS flip-flop circuit 310 that produces a gate control signal at its Q-output. The Min-OFF delay circuit 306 delays the turning-on of the switch to set the minimum off-time period of the switch. If the switching off-time period is longer than the delay period, the delay circuit 306 has no effect on the switching.

Figure 6:
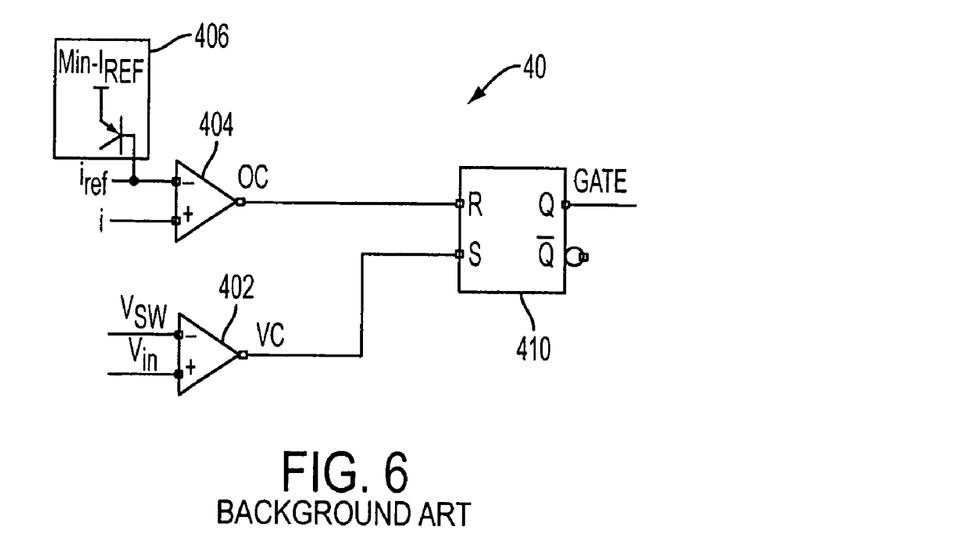
FIG. 6 illustrates minimum on-time control of the flyback switching regulator.

FIG. 6 illustrates another known way of reducing "jittering." BCM control block 40 comprises a VC comparator 402 and an OC comparator 404 that generate the VC and OC signals in a manner similar to producing these signals in the BCM arrangement in FIG. 2. Further, the BCM control block 40 includes a MIN-Iref circuit 406 for setting a minimum value of the reference current Iref. For example, the MIN-Iref circuit 406 may be a limiting circuit that prevents the reference current Iref from falling below a preset minimum value. The OC and VC signals are respectively supplied to the R- and S-inputs of the flip-flop circuit 410 that produces the gate control signal at its Q-output. By setting a minimum value for the reference current Iref, the BCM control block 40 sets the minimum time period for the sensed current I to reach the reference value Iref. As a result, the minimum on-time period for the switching of the flyback switching regulator is established.

Although the BCM arrangements in FIGS. 5 and 6 limit the switching frequency of a BCM converter to a certain range, the switching frequency remains variable. Therefore, the above-discussed disadvantages of BCM converters are reduced but not eliminated.

Figure 7:
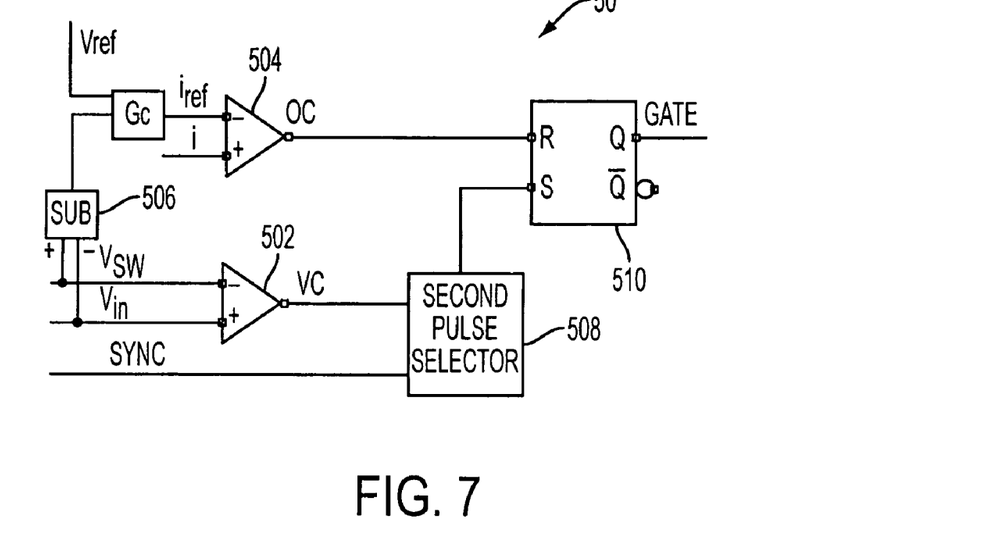
FIG. 7 shows an exemplary embodiment of a conduction mode control block for controlling the flyback switching regulator in accord with the present disclosure.

FIG. 7 shows a conduction mode control arrangement that enables the flyback switching regulator 10 to operate alternatively in BCM or in DCM, combining advantages of these conductions modes, in accord with the teachings herein. Also, as discussed in more detail below, the conduction mode control arrangement in FIG. 7 enables the flyback switching regulator to operate in a hybrid BCM/DCM mode, in which the switching regulator operates in BCM at some predetermined conditions and operates in DCM at other predetermined conditions.

A conduction mode control block 50 in FIG. 7 comprises a VC comparator 502 and an OC comparator 504 that respectively generate the described VC and OC signals using a subtraction circuit 506 and compensator Gc in a manner similar to production of these signals in the BCM arrangement in FIG. 2. In addition, the conduction mode control block 50 receives an external synchronization signal SYNC having a programmable frequency $f_{sync}$. For example, the SYNC signal may be generated by an external pulse signal generator. The VC signal and the SYNC signal are supplied to a second pulse selector (SPS) 508 having its output coupled to an S-input of the flip-flop circuit 510 that produces a gate control signal at its Q-output. The gate control signal controls switching of the switch S (FIG. 1) in the flyback switching regulator 10.

The SPS 508 is configured to pass to its output only one or the other of the supplied input signals. In particular, only that input signal which is supplied later than the other input signal is allowed to pass to the output of the SPS 508. As shown in the exemplary embodiment in FIG. 8, the SPS 508 may comprise RS flip-flop circuits 602 and 604, an AND gate circuit 606 and a delay circuit 608. The VC and SYNC signals are respectively supplied to S-inputs of the flip-flop circuits 602 and 604 to set output signals at their Q-outputs. The output signals of the flip-flop circuits 602 and 604 are supplied to respective inputs of the AND gate circuit 606. The output signal of the AND gate 606 is delayed by the delay circuit 608 and supplied to R-inputs of the flip-flop circuits 602 and 604 to reset their output signals. For example, the delay circuit 609 may delay the output signal of the AND gate 606 by about 100 ns.

Figure 8:
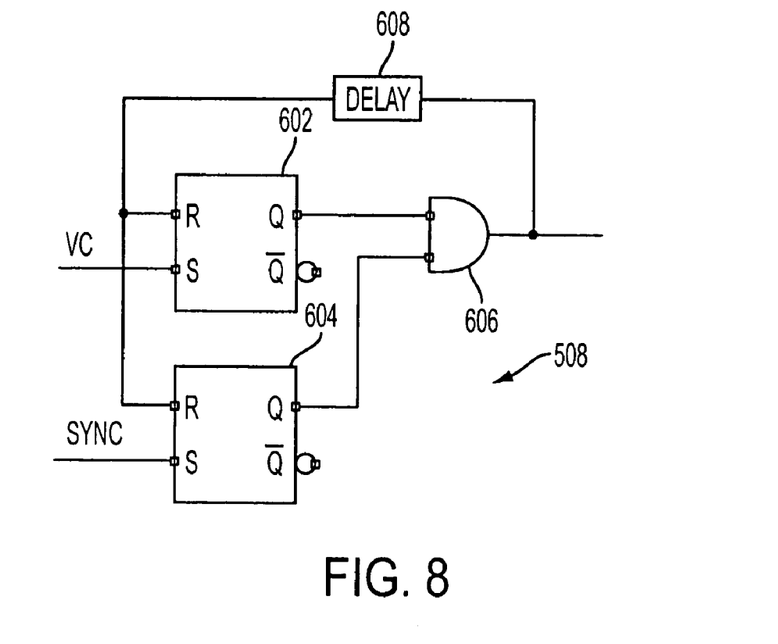
FIG. 8 shows an exemplary embodiment of a second pulse selector in the conduction mode control block.

As the AND gate circuit 606 produces its output signal only after the last input signal is supplied at its input, the SPS 508 passes the VC signal to set the gate control signal if the VC signal is produced after the SYNC signal is supplied, and passes the SYNC signal to set the gate control signal if the VC signal is produced before the SYNC signal is supplied. Further, when the SYNC signal is at a high level, the VC signal always passes to the input of the flip-flop circuit 510. However, when the SYNC signal is at a low level, the VC signal is prevented from passing to the input of the flip-flop circuit 510 to keep the switch S of the flyback switching regulator in an off-state.

Figure 9:
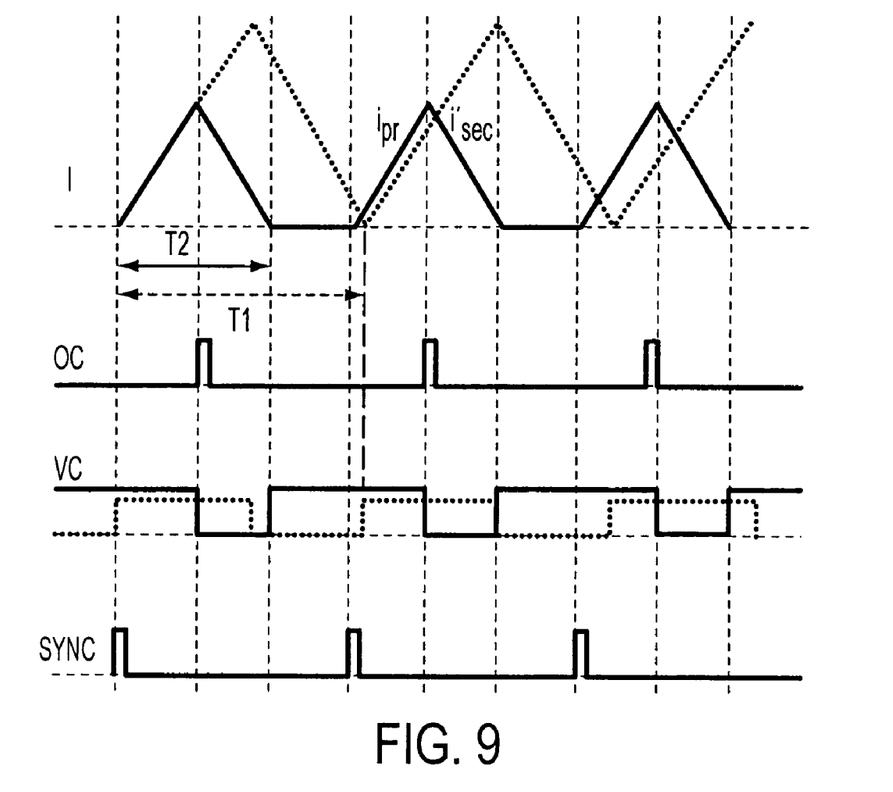
FIG. 9 shows a timing diagram illustrating selection of a conduction mode for the flyback switching regulator in accord with the present disclosure.

As illustrated by the waveforms in FIG. 9, the conduction mode control block 50 uses control signals OC, VC and SYNC to control switching of the flyback switching regulator 10. The switch S is turned off by the OC signal when the sensed current I reaches the reference current value Iref.

If the SYNC signal is supplied before the VC signal is produced (dotted waveform of the VC signal), i.e. before the switch voltage Vsw falls below the Vin level, the VC signal is selected by the SPS 508 to turn on the switch S by setting the gate control signal. Therefore, the flyback switching regulator 10 operates in BCM (dotted waveform of current I). During BCM operation, the VC signal causes the switch S to turn on immediately after the current i'sec in the secondary winding falls to a zero level. Hence, in BCM, the current in the transformer Tr is maintained at a non-zero level during time period T1 within each switching cycle of the switching regulator 10.

If the SYNC signal is supplied after the VC signal is produced (solid waveform of the VC signal), i.e. after the switch voltage Vsw falls below the Vin level, the SYNC signal is selected by the SPS 508 to turn on the switch S by setting the gate control signal. Therefore, the flyback switching regulator 10 operates in DCM (solid waveform of current I). During DCM operation, the current in the transformer Tr remains at a zero level until the SYNC signal is supplied to turn on the switch S. Hence, in DCM, the current in the transformer Tr is maintained at a non-zero level during time period T2 within each switching cycle of the switching regulator 10. The time period T1 differs from the time period T2.

A desired conduction mode of the flyback switching regulator 10 may be set by programming the frequency $f_{sync}$ of the SYNC signal. In particular, to set the flyback switching regulator 10 into the BCM, the frequency $f_{sync}$ may be set higher than the expected maximum BCM frequency. In this case, the second pulse selector 508 selects the VC signal instead of the SYNC signal. To operate the flyback switching regulator 10 in DCM, the frequency $f_{sync}$ may be set lower than the expected minimum BCM frequency. In this case, the second pulse selector 508 selects the SYNC signal instead of the VC signal. The BCM frequency may correspond to the frequency of the VC signal.

Further, to establish a hybrid BCM/DCM mode of operation, the frequency $f_{sync}$ may be selected in a range between the expected maximum BCM frequency and the expected minimum BCM frequency. In the hybrid BCM/DCM mode, the flyback switching regulator 10 may automatically switch between the BCM and DCM modes of operation depending on load and line conditions. For example, the flyback switching regulator 10 will operate in the BCM at a heavier load, and in the DCM at a lighter load.

Accordingly, the flyback switching regulator 10 may be controlled to operate in any one of three conduction modes using the same control arrangement such as shown in FIG. 7. By selecting a respective frequency of the SYNC signal, the flyback switching regulator 10 may be set to operate in DCM for lower power applications or at light load, to operate in BCM for higher power applications or at full load, and to operate in the hybrid BCM/DCM mode for intermediate power applications or at variable load.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A control system for controlling a switching circuit having a switching element and an inductive element coupled to an output of the switching element, the system comprising:
    a switching control circuit configured for controlling the switching element to operate the switching circuit in a first conduction mode of operation, in which current in the inductive element is maintained at a non-zero level during a first time period within each of successive switching cycles, in the first conduction mode, the switching element being controlled to turn on when the current in the inductive element falls to a zero level,
    the switching control circuit being further configured for controlling the switching element to operate the switching circuit in a second conduction mode of operation, in which the current in the inductive element is maintained at a non-zero level during a second time period within each of successive switching cycles, the first time period being different from the second time period, and
    a conduction mode control circuit for controlling a conduction mode of operation of the switching circuit so as to select between operation of the switching circuit in the first conduction mode and operation of the switching circuit in the second conduction mode.

2. The system of claim 1, wherein the first conduction mode of operation is a boundary conduction mode (BCM), and the second conduction mode of operation is a discontinuous conduction mode (DCM).

3. The system of claim 1, wherein the mode control circuit is configured for enabling the switching circuit to operate in a third conduction mode.

4. The system of claim 3, wherein, in the third conduction mode, the switching circuit is controlled to operate in the first conduction mode in response to a first predetermined condition and to operate in the second conduction mode in response to a second predetermined condition.

5. The system of claim 3, wherein, in the third conduction mode, the switching circuit is controlled to operate in BCM in response to the first predetermined condition and to operate in DCM in response to the second predetermined condition.

6. The system of claim 3, wherein, in the third conduction mode, the switching circuit is controlled to operate in BCM at a heavy load condition and to operate in DCM at a lower load condition.

7. The system of claim 1, wherein the switching circuit includes a switching regulator.

8. The system of claim 1, wherein the switching circuit includes a flyback switching regulator having a transformer.

9. The system of claim 8, wherein in the first conduction mode of operation, current in the transformer is maintained at a non-zero level during the first time period within each switching cycle; and in the second conduction mode of operation, current in the transformer is maintained at a non-zero level during the second time period within each switching cycle.

10. The system of claim 1, wherein the mode control circuit is responsive to a mode control signal having a parameter programmable to select between the first conduction mode and the second conduction mode.

11. The system of claim 10, wherein the parameter of the mode control signal is programmable to enable the switching circuit to operate in a third conduction mode combining the first conduction mode and the second conduction mode.

12. The system of claim 1, wherein the mode control circuit is responsive to a mode control signal having a frequency programmable to select between the first conduction mode of operation and the second conduction mode of operation.

13. The system of claim 12, wherein the frequency of the mode control signal is programmable to enable the switching circuit to operate in a third conduction mode of operation combining the first conduction mode of operation and the second conduction mode of operation.

14. The system of claim 13, wherein the mode control circuit includes a signal selector for selecting between the mode control signal and a conduction mode support signal produced by the switching control circuit.

15. The system of claim 13, wherein the switching circuit is configured to be controlled to operate in the first conduction mode when the frequency of the mode control signal is set to a value exceeding an expected maximum frequency of the conduction mode support signal.

16. The system of claim 15, wherein the switching circuit is configured to be controlled to operate in the second conduction mode when the frequency of the mode control signal is set to a value less than an expected minimum frequency of the conduction mode support signal.

17. The system of claim 16, wherein the switching circuit is configured to be controlled to operate in the third conduction mode when the frequency of the mode control signal is set to a value in a range between the expected minimum frequency and the expected maximum frequency of the conduction mode support signal.

18. A power supply system comprising:
a switching circuit having a switching element and an inductive element coupled to an output of the switching element,
the switching circuit being configured to operate in a first conduction mode of operation, in which current in the inductive element is maintained at a non-zero level during a first time period within each of successive switching cycles, in the first conduction mode, the switching element being controlled to turn on when the current in the inductive element falls to a zero level,
the switching circuit being further configured to operate in a second conduction mode of operation, in which the current in the inductive element is maintained at a non-zero level during a second time period within each of successive switching cycles, the first time period being different from the second time period, and
a mode control circuit for controlling a conduction mode of operation of the switching circuit, the mode control circuit being responsive to a mode control signal having a parameter programmable to enable the switching circuit to switch between the first conduction mode of operation.

19. The system of claim 18, wherein the mode control circuit is configured for controlling the conduction mode in response to the mode control signal having programmable frequency.

20. The system of claim 19, wherein the mode control circuit includes a signal selector for selecting between the mode control signal and a conduction mode support signal supplied to the mode control circuit to operate the switching circuit in the first conduction mode.

21. The system of claim 20, wherein the mode control circuit further includes an output circuit responsive to the signal selector for providing a switch control signal for controlling the switching element.

22. The system of claim 21, wherein the signal selector is configured for passing to the output circuit a selected one of the mode control signal and the conduction mode support signal, and preventing from passing to the output circuit a non-selected one of the mode control signal and the conduction mode support signal.

23. The system of claim 22, wherein the signal selector is configured to pass the conduction mode support signal to the output circuit to operate the switching circuit in the first conduction mode if the signal selector receives the conduction mode support signal after receiving the mode control signal.

24. The system of claim 23, wherein the signal selector is configured to pass the mode control signal to the output circuit to operate the switching circuit in the second conduction mode if the signal selector receives the mode control signal after receiving the conduction mode support signal.

25. The system of claim 24, wherein the signal selector includes first and second flip-flop circuits having respective set inputs supplied by the conduction mode support signal and the mode control signal respectively.

26. The system of claim 25, wherein the signal selector further includes an output gate circuit responsive to respective outputs of the first and second flip-flop circuits and having an output connected to respective reset inputs of the first and second flip-flop circuits.

27. The system of claim 18, wherein the switching circuit includes a flyback switching regulator having a transformer.

28. The system of claim 27, wherein in the first conduction mode of operation, current in the transformer is maintained at a non-zero level during the first time period within each switching cycle; and in the second conduction mode of operation, current in the transformer is maintained at a non-zero level during the second time period within each switching cycle.

29. The system of claim 18, wherein the mode control circuit is configured to enable the switching circuit to operate in BCM and DCM, alternatively, in response to prescribed conditions.

30. A method of controlling a switching circuit having a switching element and an inductive element coupled to an output of the switching element, the method comprising the steps of:
supporting operation of the switching circuit in a first conduction mode, in which current in the inductive element is maintained at a non-zero level during a first time period within each switching cycle, in the first conduction mode, the switching element being controlled to turn on when the current in the inductive element falls to a zero level,
supporting operation of the switching circuit in a second conduction mode of operation, in which the current in the inductive element is maintained at a non-zero level during a second time period within each of successive switching cycles, the first time period being different from the second time period, and
providing a mode control signal having a parameter programmable to select between operation of the switching circuit in the first conduction mode and operation of the switching circuit in the second conduction mode.

31. The method of claim 30, wherein the parameter of the mode control signal is programmable to enable operation of the switching circuit in a third conduction mode combining the first conduction mode and the second conduction mode.

32. The method of claim 31, wherein the first conduction mode is BCM, and the second conduction mode is DCM.

33. The method of claim 31, wherein frequency of the mode control signal is programmable to set a conduction mode of the switching circuit.

34. The method of claim 33, further comprising the step of selecting between the mode control signal and an additional control signal to provide control of the switching element.

35. The method of claim 34, wherein the switching circuit is controlled to operate in the first conduction mode if the additional control signal is supplied after the mode control signal.

36. The method of claim 35, wherein the switching circuit is controlled to operate in the second conduction mode if the additional control signal is supplied before the mode control signal.

* * * * *